United States Patent
Witzel et al.

(10) Patent No.: US 8,634,326 B2
(45) Date of Patent: Jan. 21, 2014

(54) METHOD AND NODE FOR THE CONTROL OF A CONNECTION IN A COMMUNICATION NETWORK

(75) Inventors: Andreas Witzel, Herzogenrath (DE); Karl Hellwig, Wonfurt (DE); Dirk Kampmann, GP Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 512 days.

(21) Appl. No.: 12/525,200

(22) PCT Filed: Dec. 13, 2007

(86) PCT No.: PCT/EP2007/010916
§ 371 (c)(1), (2), (4) Date: Feb. 24, 2010

(87) PCT Pub. No.: WO2008/092496
PCT Pub. Date: Aug. 7, 2008

(65) Prior Publication Data
US 2010/0150023 A1 Jun. 17, 2010

(30) Foreign Application Priority Data
Feb. 2, 2007 (EP) .................................. 07002366

(51) Int. Cl.
*H04L 12/66* (2006.01)
*H04B 7/212* (2006.01)
*G06F 15/173* (2006.01)

(52) U.S. Cl.
USPC ............ 370/254; 370/348; 370/352; 709/223

(58) Field of Classification Search
USPC .................. 370/252–254, 312–328, 345–352, 370/442–510; 709/224–229
See application file for complete search history.

(56) References Cited

U.S. PATENT DOCUMENTS

| | | | |
|---|---|---|---|
| 6,671,367 B1 * | 12/2003 | Graf et al. ..................... | 379/229 |
| 6,909,690 B1 * | 6/2005 | Xu et al. ........................ | 370/230 |
| 7,072,959 B2 * | 7/2006 | Huart et al. ................... | 709/223 |
| 7,426,219 B2 * | 9/2008 | Scholte ......................... | 370/510 |
| 7,586,923 B2 * | 9/2009 | Zhao et al. ............... | 370/395.52 |
| 7,680,137 B2 * | 3/2010 | Mao .............................. | 370/412 |
| 7,738,440 B2 * | 6/2010 | Riley et al. .................... | 370/348 |
| 7,983,243 B2 * | 7/2011 | Casey et al. ................... | 370/352 |
| 2003/0063569 A1 * | 4/2003 | Kalliokulju et al. .......... | 370/252 |
| 2005/0226219 A1 | 10/2005 | Casey et al. | |
| 2007/0133516 A1 * | 6/2007 | Stein ............................. | 370/352 |
| 2007/0140254 A1 * | 6/2007 | Tuppa ........................ | 370/395.4 |

OTHER PUBLICATIONS

Lambrecht et al.: Optimizing multimedia transcoding multicast trees Computer networkd, Elsevier Science Publishers B.V., Amsterdam. NL, vol. 50, No. 1, Jan. 16, 2006.*

* cited by examiner

*Primary Examiner* — Man Phan

(57) ABSTRACT

A Method for controlling an establishment or a modification of a connection according to a packet based transmission scheme in a communication network (100) comprising a plurality of nodes (102-112) is proposed. The connection (113) to be established or modified comprises or utilizes one or more entities potentially causing a transmission delay for a transmission over the connection. An indicator indicating an expected accumulated delay for the connection (124) is sent between nodes controlling the connection and one of the nodes controlling the connection checks the indicator when it performs a decision on the packetisation time to be applied for the connection.

29 Claims, 6 Drawing Sheets

| SUPPORTED CODEC LIST WITH TAD ELEMENT LISTING INDIVIDUAL DELAY VALUES FOR CANDIDATE PATH |
|---|
| CODEC #1 |
| CODEC #2 |
| ... |
| CODEC #N — TAD ELEMENT: TAD (CODEC #1) = ACCUMULATED DELAY ALONG CANDIDATE PATH FOR CODEC #1; TAD (CODEC #2) = ACCUMULATED DELAY ALONG CANDIDATE PATH FOR CODEC #2; ... ; TAD (CODEC #3) = ACCUMULATED DELAY ALONG CANDIDATE PATH FOR CODEC #3 |
| SUBSCRIBED QUALITY LEVEL |
| TAD THRESHOLD |
| HIGH COMPRESSION ROUTE INDICATION |

Fig. 3

METHOD AND NODE FOR THE CONTROL OF A CONNECTION IN A COMMUNICATION NETWORK

TECHNICAL FIELD

The invention relates to method and a node for controlling a connection in a communication network and in particular for controlling on a call-by-call basis a selection of a packetisation time to be applied for a connection.

BACKGROUND

Communication networks consist of interconnected nodes and can be subdivided into core networks and access networks, the latter providing access to user equipment, for example a wireless access for mobile user equipment to a radio access network. Core networks interconnect access networks and further networks, e.g. other core networks or the Internet. In the Universal Mobile Telecommunications System (UMTS) architecture, an access network can be controlled by one or more Radio Network Controllers (RNC), which is connected to the core network and provides access to the core network, i.e. serves as access node. In the Global System for Mobile Communications (GSM) architecture, the access network can be controlled by one or more Base Station Controllers (BSC). The 3G core network is controlled by one or more Mobile Switching Centres (MSCs). These MSCs also influence the decisions in RNC and BSC.

For the transmission on a connection, speech (or other media) is compressed by encoding the speech (or the other media) according to one or more encoding/decoding schemes (and is subsequently decoded). Coding and decoding schemes are both referred to subsequently herein as coding schemes and alternatively denoted "codecs".

Recent communication networks transport speech or other media using a packet based transmission. When applying packet based transmission a speech or media data stream is segmented into data portions constituting payload data of a data packet to which a packet header comprising addressing information of the data packet is attached.

When applying compression to the speech or media data payload, the fraction of the transmission bandwidth that is associated with the transmission of the packet headers, also termed the transport overhead, may become significant.

To address this problem different technologies have been developed to reduce the transmission bandwidth needed for the transmission of the packet headers. Transport header compression is a technology, wherein at a data source and a data sink an association between the a packet header and a packet header identifier is maintained and the packet header is replaced by its identifier at the data source, the data packet is routed along the transmission path using the packet header identifier, which is replaced by the associated packet header at the data sink. As the packet header identifier has a significantly smaller data size than the packet header itself, transmission bandwidth for transmitting the header identifier is also smaller. Packet header compression has been developed for IP (internet protocol), UDP (User Datagram Protocol), and RTP (real time protocol) as transmission protocols and standardised by the IETF (Internet Engineering Task Force).

Another solution to reduce the transmission overhead is to combine the payload data of multiple calls when transmitting the payload over a common transmission path portion. Also this solution has been standardised by the IETF. In the context of packet transmission this technology it is termed multiplexing.

Yet another solution is to adapt the amount of payload data which is transmitted from a particular data source to a corresponding data sink. By increasing the amount of payload transmitted within a single data packet the ratio between packet header size and the size of the payload of the data portion decreases, and by this the portion of the transmission bandwidth which is consumed for the transmission of the packet header is reduced accordingly. This solution to reduce the transport overhead is termed packetisation.

When increasing an amount of payload to be transmitted within a single speech or media data portion, the time represented by a single speech or media data portion increases as well. This time corresponds to the time needed to present the converted speech or media data to a listener and is termed the packetisation time of a speech or media data packet.

Applying packetisation can significantly reduce the transmission bandwidth, and the transmission costs, thus saving resources that are scarce in many telecommunication networks.

However, an increase of the packetisation time may affect the perceived communication quality.

SUMMARY

Therefore it is an object of the invention to provide a method for controlling the selection of the packetisation time to be applied in a communication network.

This object is solved by a method for controlling an establishment or a modification of a connection according to a packet based transmission scheme in a communication network comprising a plurality of nodes, wherein the connection to be established or modified comprises or utilizes one or more entities potentially causing a transmission delay for a transmission over the connection, and wherein an indicator indicating an expected accumulated delay for the connection is sent between nodes controlling the connection and wherein one of the nodes controlling the connection checks the indicator when it performs a decision on the packetisation time to be applied for the connection.

By this a selection of the packetisation time can be controlled to balance potential bandwidth savings and perceived transmission delay.

Advantageously the one of the nodes controlling the connection that selects a packetisation time to be applied for the connection sends a control message towards a bearer node performing a packetisation for the connection to control the bearer node to apply the selected packetisation time.

By this the packetisation time to be applied for a connection can be controlled efficiently. Advantageously an intermediate node controlling one or more of the entities potentially introducing a delay to the connection checks the indicator and adjusts it before forwarding it to a further node controlling the connection.

By this a precise calculation of the accumulated delay can be performed.

Advantageously the one of the nodes controlling the connection checks an indication indicating a delay value accepted for the connection when it performs the decision on the packetisation time to be applied for the connection.

By this the perceivable delay comprising the transmission delay and the delay associated with the packetisation time can be controlled to be below the accepted delay value. Thus a minimum quality concerning the perceivable delay can be guaranteed.

According to a particular embodiment the overall delay value accepted for the connection is predefined for the communication network.

Further advantageously the connection to be established or modified is a connection for a subscriber having a subscription for the communication network and wherein the overall delay value accepted for the connection is associated with said subscription.

By this an adequate billing can be provided considering the perceivable connection quality regarding a speech delay and the usage of network resources.

The overall delay value accepted for the connection may be associated with the subscription of the originating or the terminating subscriber or with both the subscription of the originating and the terminating subscriber.

Further advantageously a subscribed quality level indicating a target quality level for the subscriber is associated with the subscription, and the one of the nodes controlling the connection checks the subscribed quality level when it performs the decision on the packetisation time to be applied for the connection. By this an adequate billing can be provided considering a perceivable connection quality and the usage of network resources.

In a accordance with an advantageous embodiment the connection comprises or utilises one or more entities potentially impairing the connection quality, and wherein an impairment indicator indicating an expected accumulated impairment is received in the one of the nodes controlling the connection and wherein the one of the nodes controlling the connection checks the impairment indicator when it performs the decision on the packetisation time to be applied for the connection. By this the combined effect of the delay and the quality impairment on the perceivable connection quality can be considered to select an acceptable delay value.

Further advantageously the connection comprises or utilises one or more connection stages on that the transmission bandwidth should be minimized, and wherein a high compression route indicator indicating the demand to minimize the transmission bandwidth is received in the one of the nodes controlling the connection and wherein the one of the nodes controlling the connection checks the high compression route indicator when it performs the decision on the packetisation to be applied for the connection. By this the utilisation of transmission resources can be further controlled to be particularly efficient where necessary.

Advantageously the establishment or modification of the connection comprises the negotiation of one or more coding schemes to be applied for the connection and the indicator indicating the expected accumulated delay is sent during the negotiation of the one or more coding schemes.

By this the negotiation of the coding scheme and the selection of the packetisation time to be applied for the connection can be combined efficiently.

According to an advantageous aspect of the invention a list of one or more coding schemes applicable for the connection is sent between the nodes controlling the connection.

Advantageously one or more indications indicating an expected accumulated delay corresponding to associated one or more coding schemes are sent between the nodes controlling the connection.

This provides an efficient signalling for the expected accumulated delay.

Further advantageously an intermediate node controlling the connection checks the indications of the expected accumulated delay corresponding to the one or more coding schemes and adjusts it/them before forwarding it/them to a further node controlling the connection.

By this individual indications can be adjusted to account for the different transmission delays introduced for the different coding schemes, e.g. due to different processing times. Thus a precise determination of the accumulated delay is possible.

Advantageously one or more selectable packetisation times are associated with the one or more selectable coding schemes and sent between the nodes controlling the connection.

By this the packetisation times may account for different frame formats of speech or media data that provide an advantageous segmentation of the speech or media data.

According to an advantageous aspect an intermediate of the nodes controlling the connection adjusts at least one of the selectable packetisation times and forwards them to a further node controlling the connection.

By this different capabilities of processing speech or media data frames provided by an intermediate node may be accounted for.

Advantageously the one of the nodes controlling the connection checks a coding scheme to be applied for the connection in the decision on the packetisation time to be applied for the connection.

By this the combined effect of the coding scheme applied for the connection and the transmission delay on the perceivable speech quality may be accounted for. Furthermore the selectable packetisation times applicable for a particular codec can be accounted for.

In accordance with the teachings of the present invention a network node is provided for controlling an establishment or a modification of a connection according to a packet based transmission scheme in a communication network comprising a plurality of nodes. The connection to be established or modified comprises or utilizes one or more entities potentially introducing a delay to a transmission over the connection. The network node is remarkable in that it comprises a reception unit for receiving an indicator indicating an expected accumulated delay for the connection and a decision unit for checking the indicator and performing a decision on the packetisation time to be applied for the connection.

The network node provides the same or corresponding advantages as the provided method.

The network node is susceptible to the same or corresponding advantageous modifications as the provided method.

Furthermore in accordance with the teachings of the present invention a program unit on a data carrier is provided which is loadable into a network node for controlling an establishment or a modification of a connection according to a packet based transmission scheme in a communication network comprising a plurality of nodes, wherein the connection to be established or modified comprises or utilizes one or more entities potentially introducing a delay to a transmission over the connection. The program unit comprises code for instructing the network node to perform the following steps when the program unit is run on the network node: receiving an indicator indicating an expected accumulated delay for the connection and checking the indicator in a decision on the packetisation time to be applied for the connection.

The network node provides the same or corresponding advantages and is susceptible to the same or corresponding advantageous modifications as the provided method.

BRIEF DESCRIPTION OF THE DRAWINGS

The following figures show:

FIG. 3 is a block diagram depicting a message format in accordance with the teachings of the present invention.

DETAILED DESCRIPTION OF EMBODIMENTS

In the following the invention is described in more detail by means of embodiments and figures. Equal reference signs indicate equal elements.

Figure 1:
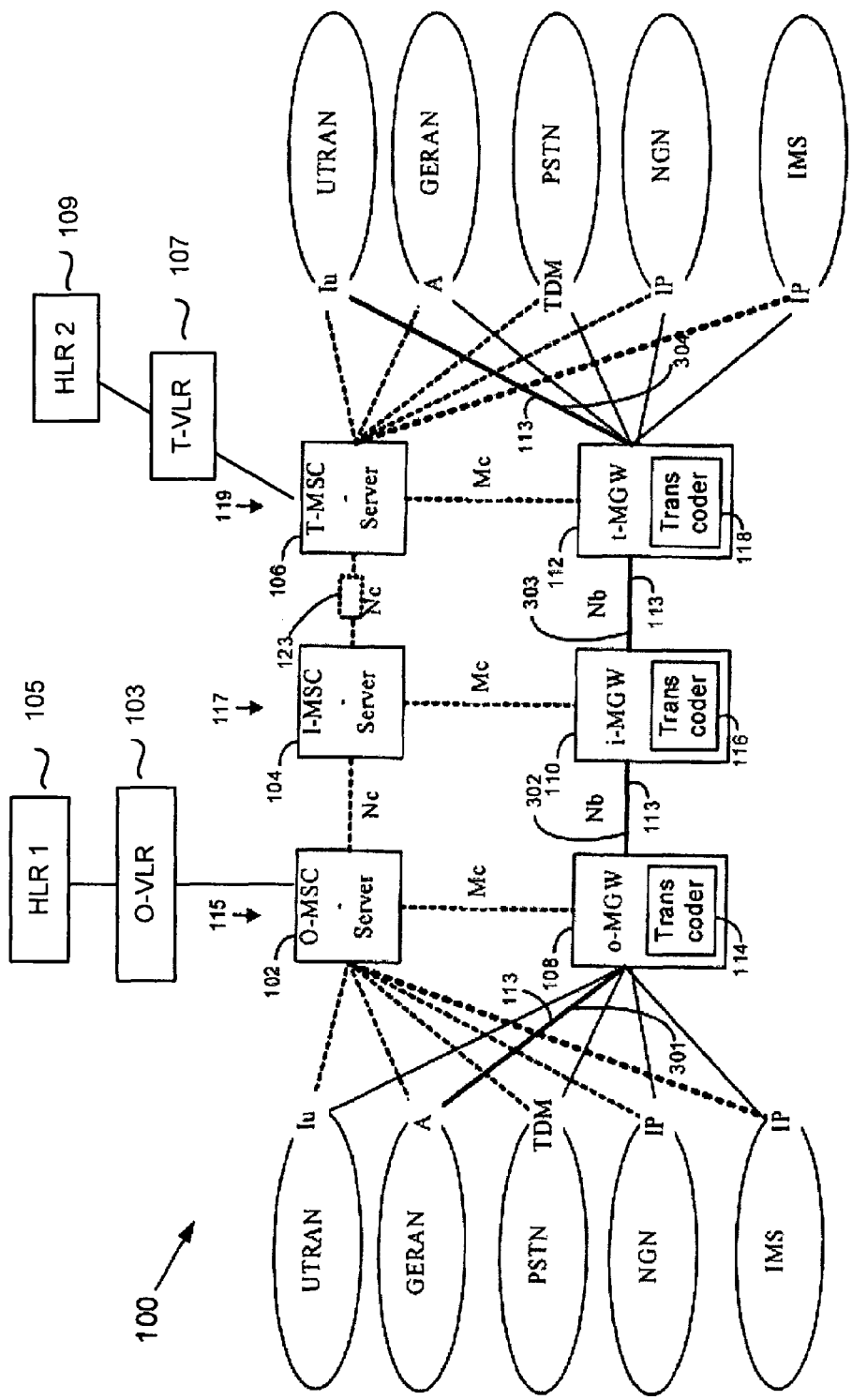
FIG. 1 is a block diagram illustrating a mobile communication network for applying the present invention.

Turning now to FIGS. 1-6, exemplary embodiments of the invention will now be described. First, with reference to FIG. 1, a communication system 100 is illustrated, in which the invention is implemented. Communication system 100 may be a combination wireless/wireline system. Communication system 100 includes a set of nodes 102-112 through which signals are routed that pertain to a communication connection, such as an individual speech or video telephone conversation conducted between mobile telephones. The individual nodes represent individual pieces of telecommunication equipment, such as servers, computer processors, and the like, or systems composed of such components. In the example of FIG. 1, the nodes include a set of MSC servers or control nodes 102, 104, 106 through which control signals are routed and a set of MGWs (Media Gateways) or payload nodes 108, 110, 112, that are controlled by the MSC servers 102, 104, 106 and through which the actual payload data corresponding to a connection 113 is routed and/or processed therein. The connection 113 can be e.g. a speech or a video connection. Routing and/or processing of the payload data through the MGWs 108, 110, 112 introduces a delay to a payload transmission over the connection. The delay introduced into the payload transmission may be associated with a specific type of processing, such as echo cancellation, buffering, multiplexing, switching or transcoding and/or to specific hardware or software devices within the media gateways such as echo cancellers, buffers, multiplexers, site routers, switches or transcoders. Different amounts of delay introduced may be associated with corresponding devices and/or or kinds of processing and associations between an expected or typical amount of delay and a corresponding processing and/or device type may be stored in the MSC servers 102, 104, 106, that control the MGWs 108, 110, 112.

Furthermore, in accordance with the teachings of the present invention, processing of speech or video payload data may include a packetisation of several speech or video data frames at the originating MGW 108 to constitute the payload of a single IP packet. Speech or video data payload received from an access network at the originating MGW 108 can thus be transmitted over the transmission stages 302 and 303 via IP transport mechanisms further to the terminating MGW 112, where the several speech or video data frames can be unpacked from the single IP packet. By applying packetisation the transport overhead can be reduced. In accordance with the teachings of the present invention packetisation applied in the MGW 108 can be controlled by the MSC 102. In particular the packetisation time, i.e. the time represented by the speech or video data frames included in a single IP packet can be controlled by the MSC server 102.

Furthermore the nodes include a VLR (Visitor Location Register) 103 associated with the MSC Server 102 and a VLR (Visitor Location Register) 107 associated with the MSC Server 106. The VLR 103 is connectable with the HLR (Home Location Register) 105 and the VLR 107 is connectable with the HLR (Home Location Register) 109.

The exemplary connection includes four portions 301, 302, 303, and 304. Transmission of payload via the connection portions introduces a delay to the transmission via the connection that depends among others on the transmission technology used. Different amounts of transmission delay may be associated with corresponding connection portions and associations between an amount of transmission delay and a corresponding connection portion may be stored in the MSC servers 102, 104, 106. An example for a type of connection portion introducing a particular long transmission delay is a connection portion comprising a satellite link. Advantageously specific transmission delay values may be stored only for such connection portions introducing a particularly high transmission delay, for other connection portions typical delay values may be stored instead.

The nodes are shown as being arranged in stages. In particular, an originating stage 115, an intermediate stage 117, and a terminating stage 119 are illustrated. The nodes 102, 103, 105, 108 of the originating stage 115 are associated with the user equipment (not specifically shown) that originates the connection. HLR 105 is the HLR of the home network of the subscriber that uses the user equipment that originates the connection (herein termed the originating subscriber). In that context the VLR 103 stores subscription information associated with the originating subscriber, which subscription information has been previously downloaded from the HLR 105, e.g. via an Insert Subscriber Data MAP operation. According to an embodiment of the present invention said subscription information for the originating subscriber includes an overall delay value accepted for a connection for the originating subscriber, wherein the accepted delay is associated with the subscription of the originating subscriber. The accepted delay value can be a delay value for a single transmission direction, or a delay value for a two-way communication, e.g. a mouth to ear delay of a voice call. In addition according to a further advantageous embodiment said subscription information includes a subscribed quality level indicating a target quality level for the originating subscriber.

In the example shown, each stage includes one control node and one payload node. It should be understood, however, that some stages may include multiple control or payload nodes and some control nodes may control payload nodes of multiple stages. Hence, the scope of each stage is somewhat arbitrary. The term stage is used herein primarily for ease in distinguishing among originating, intermediate (if any) and terminating portions of the connection. (Note that, in the figure, O-MSC can also play the role of TSC and GMSC nodes, while I-MSC can be a TSC node only, whereas T-MSC can also be TSC.)

Depending upon the originating user equipment, signals exchanged between the originating nodes and the user equipment may be received, for example, via Iu from a UTRAN system, via A from a GERAN system, via TDM from a PSTN system, via IP from a NGN system or via IP from a IMS system. UTRAN stands for UMTS Terrestrial Radio Access Network. Iu is an abbreviation for the UTRAN interface. GERAN stands for GSM/EDGE radio access network, where EDGE refers to "enhanced data rates for GSM evolution." "A" refers to the interface within the GERAN architecture between an MSC/MGW and a base station subsystem (BSS) of the GERAN. PSTN is the public switched telephone network and TDM refers to time-division multiplexing. IMS is the IP Multimedia Subsystem and NGN refers to Next Generation Networks. In addition, depending on the originating user equipment payload data is transmitted via the different access networks from and to the MGW 108. Depending on the type of access network different amounts of transmission delay may be associated with the transmission from the originating user equipment to the MGW 108. In an advantageous implementation of the invention typical delay values associated with the different types of transmission networks are stored in the MSC 102, e.g. in an association table having a network type and an associated typical delay value as corresponding entries. Advantageously said typical delay values differentiate between a transmission from and towards the originating user equipment. Typical delay values include 55 ms for an UTRAN uplink transmission, i.e. from the originating user equipment via UTRAN to the MGW 108, 70 ms for an UTRAN downlink transmission, i.e. from the MGW 108 via UTRAN to the originating user equipment. Other typical delay values include 60 ms for a GERAN uplink transmission, i.e. the originating user equipment via GERAN to the MGW 108, and 92 ms for a GERAN downlink transmission, i.e. from the MGW 108 via GERAN to the originating user equipment.

The terminating nodes (106, 107, 109, 112) are associated with the terminating user equipment that receives the connection. HLR 109 is the HLR of the home network of the subscriber that uses the user equipment that terminates the connection (herein termed the terminating subscriber). In that context the VLR 107 stores subscription information associated with the terminating subscriber, which subscription information has been previously downloaded from the HLR 109, e.g. via an Insert Subscriber Data MAP operation. According to a particular embodiment of the present invention said subscription information for the terminating subscriber includes an overall delay value accepted for a connection for the terminating subscriber, wherein the accepted delay is associated with the subscription of the terminating subscriber. The accepted delay value can be a delay value for a single transmission direction, or a delay value for a two-way communication, e.g. a mouth to ear delay of a voice call. In addition according to a further advantageous embodiment said subscription information includes a subscribed quality level indicating a target quality level for the terminating subscriber. In case both the originating and the terminating subscriber belong to the same home network, HLR 105 and HLR 109 will probably be identical and the distinction between HLR 105 and HLR 109 becomes merely logical. Likewise, depending upon the terminating user equipment, signals exchanged between the terminating nodes and the terminating equipment may be via Iu from a UTRAN system, via A from a GERAN system, via TDM from a PSTN system or via IP from an IMS or a NGN system. The intermediate nodes (104, 110) represent any additional nodes that may be required between the originating node and the terminating nodes. In addition, depending on the terminating user equipment payload data is transmitted between the MGW 112 and the terminating user equipment via the different access networks. Depending on the type of access network different amounts of transmission delay may be associated with the transmission from the originating user equipment to the MGW 108 and, in an advantageous implementation of the invention typical delay values associated with the different types of access networks are stored in the MSC 106, in a similar way than previously described with respect to the MGW 108 and the originating access network.

In order to establish, process, and eventually terminate a connection, various messages are transmitted between the MSC servers. Exemplary messages include establishment messages, modification messages, and acknowledgement messages relating to the acknowledgement of a modification message or an establishment message. An exemplary message 123 is shown within FIG. 1, which is relayed from a MSC server 104 to MSC server 106. To relay speech for a telephone conversation, one or more transcoders (114, 116, 118) are provided within the various MGWs. Although only a single transcoder is illustrated per MGW in FIG. 1, in practice each MGW may support numerous transcoders. Additionally, although not shown, the originating user equipment or the terminating user equipment may also include one or more codecs.

The transcoders compress and decompress speech or video, as needed, using one or more codecs to enable transmission within the limited bit rate that may be associated with a particular connection, such as exemplary connection 113. Speech is compressed by a transcoder of one stage, then decompressed by a transcoder of another stage, in accordance with a particular codec that both transcoders are capable of employing. Hence, the codecs themselves essentially represent connections between transcoders. Exemplary speech codecs include GSM_HR, GSM_EFR, and AMR. Each time a codec is used, the act of coding and then decoding the speech introduces a processing delay to the transmission over the connection. Different codecs may introduce different amounts of processing delay. Furthermore the act of transcoding tends to degrade or impair the speech quality. Different codecs impair or degrade speech quality by potentially differing amounts.

Among the information contained within control messages, such as message 123, is information pertaining to the available codecs in a specific node along the connection path. In particular, the message preferably includes a list of "supported codecs," i.e. encoding/decoding schemes capable of being applied between the transcoders of the various MGWs and that may be activated or deactivated during any particular connection. Using information contained within the supported codec list, the MSC servers selectively employs codecs along connection 113. In addition to providing a list of supported codecs, message 123 preferably also includes an information element having individual impairment values, one per supported codec, that indicate the expected accumulated impairment along a candidate connection path 121 associated with the supported codec. Furthermore, as will be described in more detail below, message 123 preferably includes an information element indicating a subscribed accepted overall delay value and/or target quality level of the originating subscriber. In addition message 123 preferably includes an indicator that indicates that a required bandwidth should be minimized for at least one of the connection stages of the connection and that the bandwidth minimizing requirement has precedence over the subscribed target quality level requirement, an indication of an accumulated impairment, and/or an indication of a accepted overall delay depending on a subscription.

The information element of message 123 will be described in greater detail below.

Figure 2:
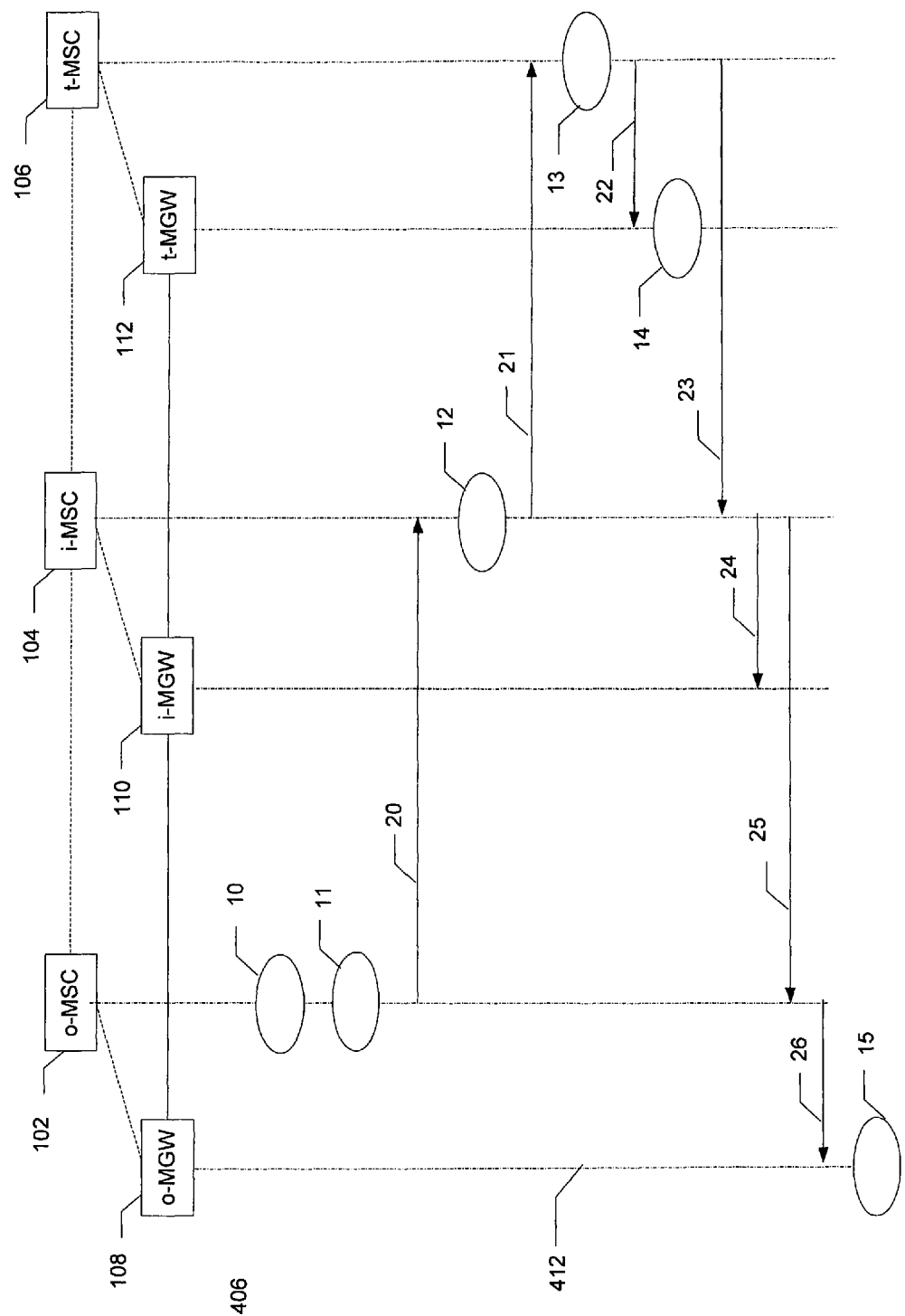
FIG. 2 is a signal sequence diagram illustrating the signalling message flow involving entities of the network of FIG. 2.

Turning now to FIG. 2 call control messages exchanged during a call set up or modification that are adapted in accordance with the teachings of the present invention will be described. The call control messages are sent between the MGWs 102, 104, and 106 and the MSCs 108, 110, and 112 of FIG. 1, the description of those is referred to rather than repeated.

Starting with the processing step 10, the originating MSC 102 determines an overall perceivable delay accepted for the connection. Said overall perceivable delay accepted for the connection may be predefined for the network 100 by the network operator or be dependent on a subscription of a subscriber for whom the connection is set up. When the subscription of the originating subscriber is concerned in that regard, subscription information of the originating subscriber, previously downloaded from the HLR 105 associated with the originating subscriber may be accessed from the VLR 103 that is associated with the originating subscriber. As described above, in accordance with the teachings of the present invention the originating subscriber data may be complemented with an accepted perceivable delay value, which could be a delay value for a single transmission direction or for a two-way communication, e.g. a mouth to ear delay of a voice call. Further advantageously said subscription information of the originating subscriber could be complemented with a subscribed quality level indicating a target quality level for the originating subscriber.

Then, at processing step 11 the MSC 102 determines an expected accumulated delay for the connection portions from the originating terminal up to and including the connection portions controlled by the originating MSC 102. The accumulated delay includes an access network transmission delay, a processing delay and, advantageously, a transmission delay considering the further transmission between the MGWs. The access network delay includes the accumulated delay expected to be introduced by connection portions from the terminal up to the MGW 108. Preferably the access network delay is determined dependent on a type of access network, e.g. by accessing a look-up table storing associations between access network types and corresponding typical delay values. Transmission delay values for a transmission from and towards the originating user equipment may be determined separately for separate transmission directions or combined to a two-way communication delay.

The processing step 11 further includes the determination of the expected processing delay introduced by processing means or devices controlled by the MSC server 102, such as devices of the MGW 108. Typically during the call set up a sequence of hardware or software devices such as echo cancellers, buffers, multiplexers, site routers, switches or transcoders is composed, that are linked together for the connection to be set up. Accordingly for each of the devices an individual expected processing delay values can be determined, e.g. by looking up an association between an amount of delay and a corresponding device type stored in an association table within the MSC server 102. The individual expected processing delay values can be combined to an overall expected delay value considering processing within the sequence of devices.

In addition the processing step 11 may include determining a transmission delay for a transmission via the connection portion between MGW 108 and MGW 110. Normally the transmission delay is largely determined by the transmission technology used. Different predetermined expected transmission delay values may be associated with corresponding connection portions and a prestored association between an expected transmission delay value and a corresponding connection portion may be accessed to determine the expected transmission delay. Such associations may be prestored in the MSC 102 for all connection portions controlled thereby. Advantageously a specific transmission delay value may be determined only for such connection portions that cause a particularly high transmission delay, such as a connection portion comprising a satellite link. For other connection portions typical delay values may be stored instead. Typical transmission delay values include 4 microseconds per kilometer for a coaxial cable, 5 microseconds per kilometer for an optical fibre, 1 millisecond for a microwave SDH (Synchronous Digital Hierarchy) transmission link, 1.4 milliseconds for a microwave PDH (Plesiochrone Digital Hierarchy) transmission link, up to 60 milliseconds for a LEO (Low Earth Orbit) satellite transmission link and up to 310 milliseconds for a HEO (High Earth Orbit) satellite transmission link.

In addition processing step 11 advantageously includes determining an accumulated impairment considering transmission and processing within the access network and up to and including the devices or connection portions controlled by the originating MSC 102.

From the access network delay, the processing delay and the transmission delay an overall expected delay associated with particular predefined transmission portions can be determined and sent with the message 20. The message 20 can be in a message format described in connection with the description of FIG. 3 or any other suitable message format.

The message 20 may additionally include the subscribed accepted perceivable delay value and/or the subscribed quality level of the originating subscriber. Furthermore the message 20 may include an indication of the accumulated impairment determined in processing step 11.

The method continues with step 12, in that similar to step 11 any additional delay potentially introduced by the devices or connection portions controlled by the intermediate MSC 104 is determined. This additional delay is determined and considered together with the accumulated delay value received in message 20 to determine an accumulated delay between the originating terminal and the connection portions controlled by the MSC 102.

Also similar to step 11 any additional impairment potentially introduced within devices controlled by the MSC 104 is considered together with the accumulated impairment received with message 20 to advantageously determine an accumulated impairment considering transmission up to and including the devices or connection portions controlled by the MSC 104.

Advantageously the processing step 12 may include checking whether one of the connection portions of the connection to be set up or modified is a connection portion, for that a particularly high compression should be applied. To that end an association table associating to each of the connection portions administered by the MSC 104 a high compression route indication or not may be accessed.

When the result of the check is yes, a high compression route indication is included in message 21 that is subsequently composed. Message 21 further comprises the accumulated delay determined at processing step 12, and preferably the accumulated impairment determined in step 12. The message 21 may further comprise the subscribed accepted perceivable overall delay value and/or also the subscribed quality level of the originating subscriber previously received in message 20. Furthermore the message 21 may include an indication of the expected speech or video data impairment, i.e. a decrease in the perceivable quality introduced by processing or transmission of the speech or video data within the connection portions and/or devices between the originating terminal up to and including the connection portions and/or devices controlled by the MSC server 104.

The method continues with processing step 13 in that the overall delay budged for the connection 103 is determined an, based on the overall delay budget the packetisation time for the connection 103 is determined.

The processing step 13 further includes determining an expected terminating access network transmission delay, i.e. a transmission delay considering the transmission delay within the access network of the terminating user equipment. This is typically dependent on the type of access network and may be determined by accessing a look-up table storing associations between access network types and corresponding typical delay values. Access network transmission delay values may be determined separately for a transmission from and a transmission towards the terminating user equipment or combined for a two-way communication delay.

To that end the processing step 13 includes the determination of the expected processing delay introduced by processing means or devices controlled by the MSC server 106, such as devices of the MGW 112. To that end a sequence of hardware or software devices controlled by the MSC server 106 and composed for the connection 113 to be set up or set up or modified can be analyzed to determine individual expected processing delay values for each of the devices, to combine them to an overall processing delay value for the device sequence. An association table storing associations between a device type and a corresponding individual processing delay that has been stored in the MSC server 106 may be accessed in this regard.

The processing step 13 further includes determining an expected accumulated delay for the connection portions controlled by the terminating MSC 106 that have not yet been considered in the accumulated delay received in message 21.

Continuing further with the processing in step 13 the accumulated delay received in message 21, the expected terminating access network delay and any expected additional transmission and processing delay are considered in combination to determine an expected accumulated delay for the connection 113.

To that end processing step 13 may include determining an overall perceivable delay accepted for the connection dependent on the subscription information.

In this regard subscription information of the terminating subscriber, previously downloaded from the HLR 109 associated with the terminating subscriber may be accessed from the VLR 107 that is associated with the terminating subscriber. The terminating subscriber data may be complemented with an accepted perceivable delay value, which could be a delay value for a single transmission direction or for a two-way communication, e.g. a mouth to ear delay of a voice call. Further advantageously the subscription information of the terminating subscriber can be complemented with a subscribed quality level indicating a target quality level for the terminating subscriber.

Alternatively or in addition the perceivable delay accepted for the originating subscriber which has been previously received with message 21 is considered to determine an overall perceivable delay accepted for the connection. This can be a delay value for a one way or a two way communication.

Advantageously the delay accepted for the originating subscriber is determined based on the information received with message 21.

Furthermore processing step 13 may include checking the message 21, whether it includes a high compression route indication, and, if the result of the check is yes to apply a less strict, i.e. larger delay value accepted for the connection 113.

The overall perceivable delay accepted for the connection 113 and the expected accumulated delay for the connection 113 are now considered in combination to determine an available delay budged and a packetisation time to be applied for the connection 113. The packetisation time can be a packetisation time applicable for a single transmission direction or for a transmission in both transmission directions. Alternatively separate delay budgets and/or packetisation times may be determined for the two transmission directions.

Further advantageously a target quality level accepted for the connection 113 is determined based on the target quality level for the originating subscriber, the target quality level of the terminating subscriber or a combination of both. The target quality level can be advantageously used in the context of the invention in various ways.

According to an advantageous embodiment the target quality level of the connection is accessed to select one or more coding schemes in view of a resulting accumulated connection quality impairment conforming with this target quality level.

Selecting one or more applicable coding schemes may be combined with the selection of the packetisation time to be applied for the connection in a plurality of advantageous ways.

According to an advantageous embodiment selectable packetisation times could be associated with corresponding selectable coding schemes. In this embodiment one or more coding schemes to be applied for the connection is or are selected in view of an expected target connection quality and for the selected one or more coding schemes, a plurality of selectable packetisation times are determined and the packetisation time is selected from these.

Further advantageously, the overall perceivable delay and the accumulated impairment may be selected in combination in view of the accepted target quality level.

By this the effect can be used that in view of the perceivable quality, a low voice or video quality can be compensated to some extend by low perceivable delay for the connection. On the one hand a relatively high transmission delay may be compensated with a high voice or video quality.

Accordingly, a coding scheme and a packetisation time to be applied for the connection are advantageously selected in a combined selection to control the corresponding combination of perceivable delay and accumulated impairment to be acceptable.

Thus one or more packetisation times and one or more coding schemes applicable for the connection are selected, and further control messages including these one or more coding schemes and/or packetisation times are sent to control the nodes of the transport network to apply the selected coding schemes and/or packetisation times.

In particular MSC server 106 sends the control message 22 comprising the selected coding schemes and/or packetisation times to the MGW 112 to control the MGW 112 to apply these coding schemes and/or packetisation times. Regarding a packetising in the transmission direction from the terminating to the originating subscriber this means that speech or data frames received from the terminating user equipment are buffered and combined such that speech or video data frames representing a selected packetisation time are transmitted in a single data packet.

With respect to the transmission direction from the originating to the terminating subscriber this means that MGW 112 is prepared to unpack a data packet comprising speech and/or video data frames representing a selected packetisation time and transmit these speech or video frames further to the terminating user equipment.

The selected one or more coding schemes and/or packetisation times are forwarded via signalling message 23 further to the intermediate MGW 104 and via signalling message 25 further to originating MGW 102.

In response, the intermediate MGW 104 sends the control message 24 comprising the selected coding schemes and/or packetisation times to the MGW 110 to control the MGW 110 to apply these coding schemes and/or packetisation times and/or to enable the MGW 110 to handle data packets formatted using the selected coding schemes and/or packetisation times.

In response to the signalling message 25 the originating MSC 102 sends control message 25 to control the MGW 108 to apply the selected coding schemes and/or packetisation times in processing step 15. Regarding a packetising in the transmission direction from the originating to the terminating subscriber this means that speech or data frames received from the originating user equipment are buffered and combined such that speech or video data frames representing a selected packetisation time are transmitted in a single data packet.

With respect to the transmission direction from the terminating to the originating subscriber this means that MGW 108 is prepared to unpack a data packet comprising speech and/or video data frames representing a respective selected packetisation time and transmit these speech or video frames further to the originating user equipment.

Turning now to FIG. 3, an information element 120 as contained within message 123 and or message 21 and relayed between MSC server 104 and MSC server 106 is described, wherein the information element 120 includes a supported codec list 122, a subscribed quality level indication 127 indicating a target quality level for the originating subscriber, as well as a total accumulated delay (TAD) data element 124 listing individual delay values 126 associated with candidate paths leading up to, and including, the supported codecs 122. Furthermore the information element 120 includes a TAD threshold 128 indicating a maximum allowed perceivable delay and a high compression route indicator 129 indicating whether a required bandwidth should be minimized for at least one of the connection stages of the connection. The TAD threshold 128 may be defined by the operator of the communication network 100 or determined according to a subscription. Regarding the (TAD) data element 124 for each particular supported codec (or other element that may affect the transmission delay) of a given stage, an individual TAD value is stored within the TAD element that represents the total expected impairment associated with the candidate path leading up to, and including, that particular codec of that particular stage. Hence, the TAD element includes the accumulated delays for each of the listed supported codecs. For the example of FIG. 1, message 123 sent from the intermediate stage to the terminating stage thereby includes a list of the five codecs supported by the originating stage, as well as an indicator value for each of the five codecs supported by the originating stage.

Each indicator value represents the expected accumulated delay value of the candidate path that leads up to, and includes, the corresponding supported codec. After the message is received by the terminating stage, the terminating stage will then change the indicator values to reflect the connection portions and devices controlled by the terminating stage. Preferably, the indicator 124 is sent only between control nodes (102-106) whereas the connection itself 113 is established between the payload nodes (108-112).

Advantageously the subscribed target quality level 127 corresponds to a range of allowed TAD values.

Figure 4:
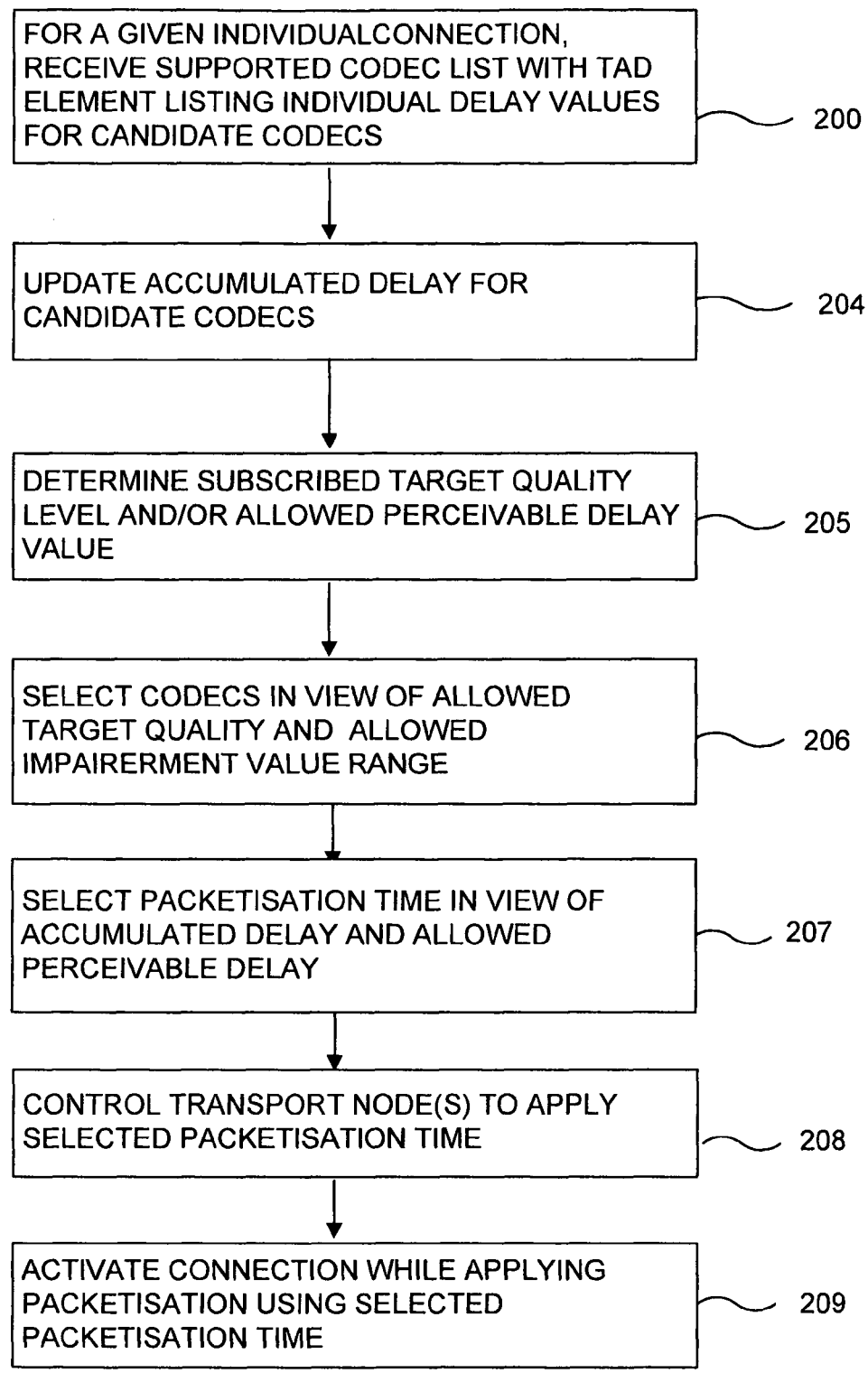
FIG. 4 is a flow chart diagram illustrating a method in accordance with the teachings of the present invention.

FIG. 4 summarizes the use of the TAD element in connection with specific attention to the terminating MSC. Briefly, beginning at step 200, for a given individual connection, such as a particular mobile call, the terminating MSC receives a supported codec list that preferably incorporates the perceivable overall delay acceptable with respect to the subscription of the subscriber that has originated the call. The supported codec list further incorporates the TAD element listing the individual delay values for the candidate paths, represented by these codec candidates. In addition the supported codec list may include the target quality level acceptable in view of the subscribed quality level of the originating subscriber. At step 204, the individual delay values are updated to reflect additional delay due to processing at terminating stage (terminating MGW 112) and the transmission between the terminating user equipment and the terminating stage. At step 205 the terminating MSC checks the subscribed quality level, either associated with the originating subscriber and previously received with the supported codec list or associated with the terminating subscriber. The subscribed quality level of the terminating subscriber may be fetched from the subscriber record of the terminating subscriber, as explained above.

Then the terminating MSC determines the allowable overall perceivable delay value range, i.e. the range of allowed perceivable delay values that corresponds to the checked subscribed quality level.

Subsequently, at step 206 the terminating MSC selects a codec to be applied for the connection in view of the allowed target quality and the allowed impairment value range.

Subsequently, at step 207 the terminating MSC selects a packetisation time to be applied for the connection so that the overall perceivable delay considering a packetisation delay and the accumulated transmission delay for the connection lies within the determined allowed delay value range.

At step 208, the terminating MSC controls the payload transmission nodes of the originating and the terminating stage to apply a packetisation respectively de-packetisation using the selected packetisation time.

Finally, at step 209, the originating MSC activates the connection. Data for the connection, such as encoded speech or video data, is routed through the payload transmission nodes that apply a packetisation and/or de-packetisation applying the received selected packetisation time.

Figure 5:
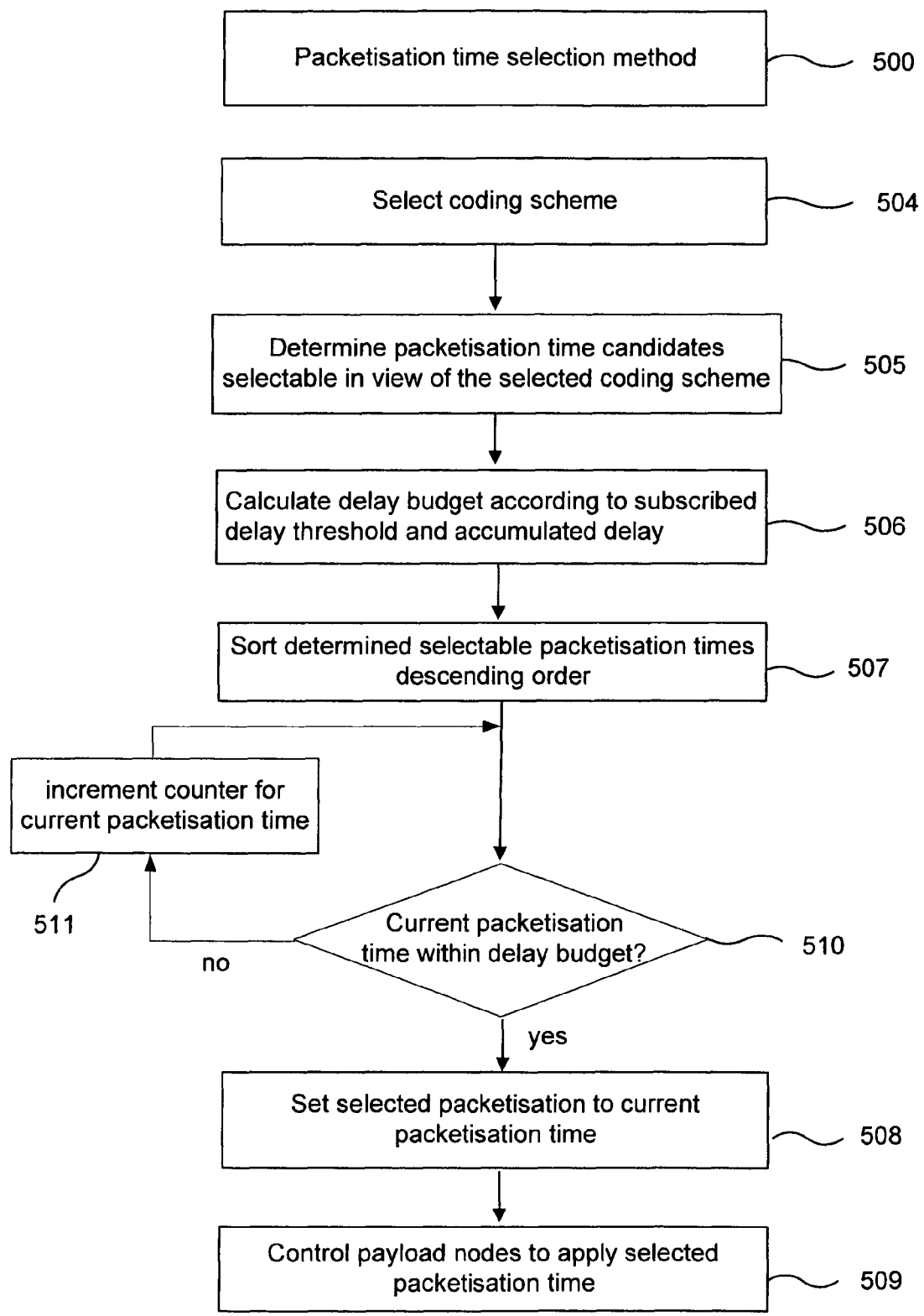
FIG. 5 is a flow chart diagram illustrating a selection of a packetisation according to one embodiment of the present invention.

Turning now to the description of FIG. 5, a method 500 for the selection of a packetisation time applicable for a selected coding scheme and conforming to the delay budget will be described.

The method 500 starts with processing step 504, in that a coding scheme to be applied for the connection is selected. The coding scheme may be selected in view of an accumulated impairment associated with the selection, which conforms with an acceptable connection quality, e.g. a connection quality conforming with a subscribed quality level for the originating or terminating subscriber.

Then, method 500 continues with processing step 505 in that packetisation times selectable in view of the selected coding scheme are determined. These can e.g. restricted to be a multiple of a time represented by a coding frame according to coding scheme.

The method continues with processing step 506, that includes determining an accumulated delay for the connection to be set up, e.g. based on an information element received with a call set up message and updated when the call set up message is sent along a path of control nodes, to consider individual delay values within devices and connection portions controlled by the control nodes.

Processing step 506 further includes determining a delay threshold for an overall delay, e.g. a perceivable mouth to ear delay. Like the acceptable connection impairment the delay value threshold may be determined to conform with a subscribed quality level for a the originating or the terminating subscriber.

Finally in step 506 a delay budget is determined according to the delay threshold and the accumulated delay. This can be for example remaining delay, when subtracting the accumulated delay from the delay threshold.

The method continues with processing step 507, in that the selectable packetisation times are sorted in descending order, i.e. starting with the largest selectable packetisation time.

Continuing with the inquiring step 510, it is determined whether the largest selectable packetisation time, which is the current packetisation time in the first processing cycle, is within the delay budget. If the answer is yes, the method continues with step 508, in that the selected packetisation time is set to the current packetisation time.

If the answer is no, the counter of the packetisation times is incremented in processing step 511, i.e. the current packetisation time is set to the next lower selectable packetisation time, which is subsequently checked to determine whether it lies within the delay budget.

The cycle of stepwise in incrementing the current delay value counter to lower packetisation times and delay budget checks is continued until a current packetisation is found, which is within the delay budged.

The selected packetisation time is then set to this current packetisation time in processing step 508.

Finally, the selected coding scheme and the selected packetisation time are sent towards the payload nodes of the connection, to control the payload nodes in step 509 to apply the selected coding scheme and the selected packetisation time.

Figure 6:
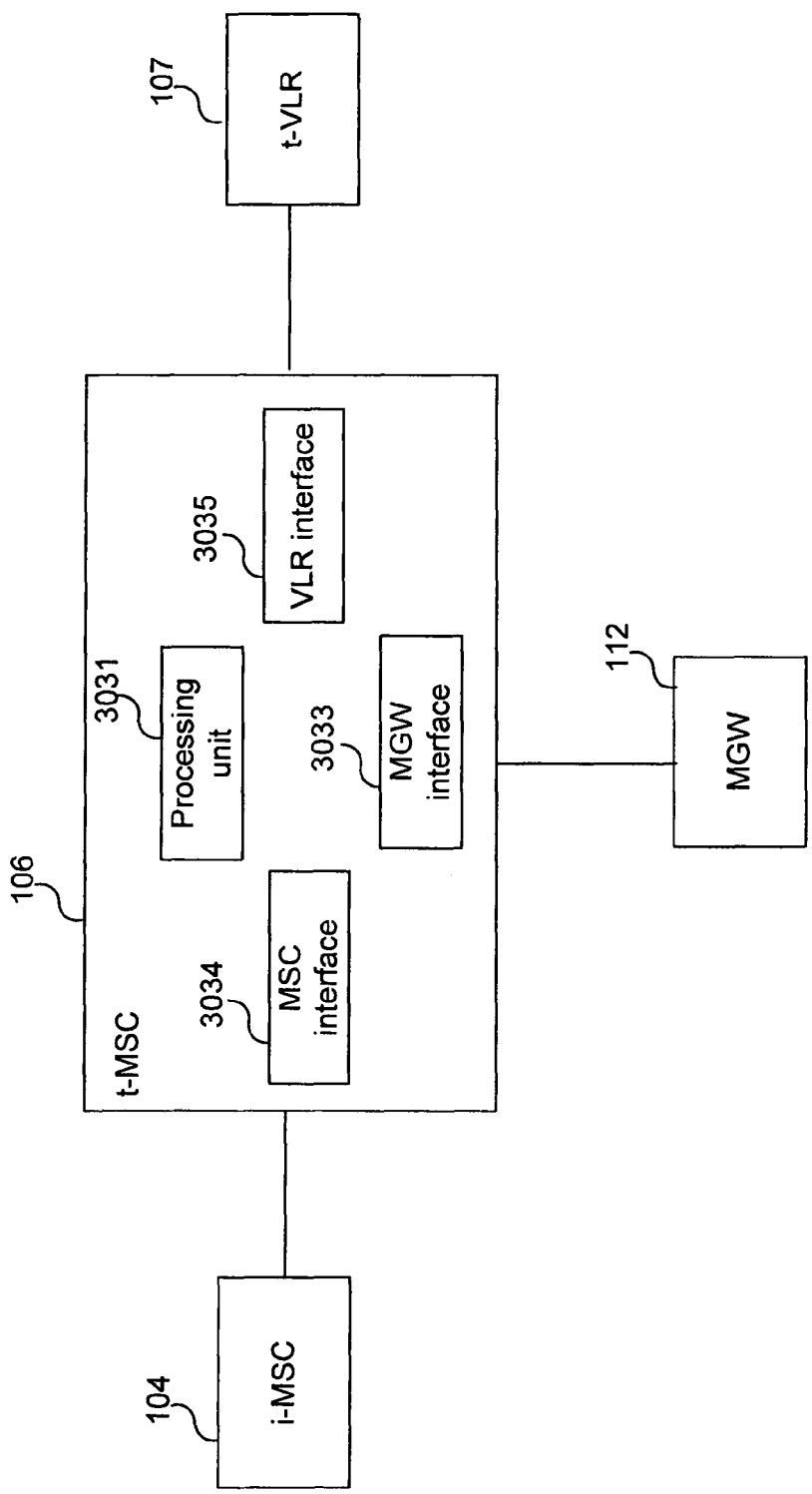
FIG. 6 is a block diagram illustrating network node in accordance with the teachings the present invention.

FIG. 6 is a block diagram illustrating the terminating MSC server in accordance with the present invention and with the network architecture of FIG. 1.

FIG. 6 depicts the MSC server 106, VLR 107 of the terminating subscriber and the MGW 112 of FIG. 1 that are connected to the MSC server 106 as previously described. The MSC server 106 is suitable for using the TAD counter in accordance with the method depicted in FIG. 4 and selecting a packetisation time in accordance with the method depicted in FIG. 5. The MSC 106 includes a MSC interface 3034 interfacing the MSC 106 to the MSC 104. The MSC 106 is capable of receiving a call set up or call modification message from MSC 104 via the MSC interface 3034. In accordance with the teachings of the present invention the call set up or modification message includes an indication of an accumulated delay comprising the delay caused by connection portions and/or devices controlled by the MSC server 104. Furthermore the call set up message may include a threshold value indicating an accepted delay for the connection to be set up or modified. In addition the call set up or modification message may include an indication of an accumulated impairment as well as an indication of the subscribed quality level of the call originating subscriber.

In accordance with the teachings of the present invention, the terminating MSC 106 further includes a Visitor Location Register (VLR) interface 3035 for interfacing the terminating MSC 106 with the VLR 107 and for receiving subscriber data, which has been complemented in accordance with the present invention with an indication of the subscribed quality level of the terminating subscriber an/or a threshold value indicating an acceptable delay threshold for the terminating subscriber In accordance with the teachings of the present invention, the MSC 106 further includes a processing unit 3031 for processing the accumulated delay value indication received from MSC 104 via MSC interface 3034 and any additional delay introduced by connection portions devices controlled by MSC server 106 to determine an overall accumulated delay value. The processing unit 3031 is further suitable for processing either the subscribed quality level of the originating and/or terminating subscriber or the threshold value indication of the originating, or the terminating subscriber or a combination of these threshold value indications to determine an threshold value for the a transmission delay acceptable for the connection to be set up or modified. The processing unit 3031 is further adapted to process both accumulated delay value and the delay threshold value to determine a delay budget and to a select a packetisation time to be applied for the connection to be established or modified that lies within the delay budget. The MSC 106 further includes a Media Gateway (MGW) interface 3033 interfacing the MSC 106 with the MGW 112. In accordance with the teachings of the present invention the MSC 106 is adapted to control the MGW 112 via the MGW interface 3033 to apply the selected packetisation time as previously described.

Furthermore, in accordance with the teachings of the present invention the MSC 106 is adapted to control via the MSC interface 3034 any payload nodes controlled by the MSC 104 or any other payload nodes to apply the selected packetisation time.

The invention claimed is:

1. A method for controlling an establishment or a modification of a connection according to a packet based transmission scheme in a plurality of different communication networks comprising a plurality of nodes, wherein the connection to be established or modified comprises or utilizes one or more entities causing a transmission delay over the connection, an indicator indicating an expected accumulated delay of transmission of packets for the connection is sent between nodes controlling the connection wherein one of the nodes controlling the connection checks the indicator when it determines a packetisation time it takes for sending packets to be applied for the connection and selects from a memory having delay values associated with the different communication networks in an association table having a network type and an associated delay value as corresponding entries where the delay values differentiate a transmission from and towards an originating node for the connection.

2. The method according to claim 1 wherein the one of the nodes controlling the connection selects a packetisation time to be applied for the connection and sends a control message towards a bearer node, performing a packetisation, for the connection to control the bearer node to apply the selected packetisation time.

3. The method according to claim 1, wherein an intermediate node controlling the connection checks the indicator and adjusts it before forwarding it to a further node controlling the connection.

4. The method according to claim 1, wherein the one of the nodes controlling the connection checks an indication indicating a delay value accepted for the connection When it performs the decision on the packetisation time to be applied for the connection.

5. The method according to claim 4, wherein the overall delay value accepted for the connection is predefined for the communication network.

6. The method according to claim 4, wherein the connection to be established or modified is a connection for a subscriber having a subscription for the communication network and the overall delay value accepted for the connection is associated with said subscription, the overall delay value accepted for the connection is determined according to a subscription of an originating subscriber and a subscription of a terminating subscriber.

7. The method according to claim 6, wherein the overall delay value accepted for the connection is associated with the subscription of an originating subscriber.

8. The method according to claim 6, wherein the overall delay value accepted for the connection is associated with the subscription of a terminating subscriber.

9. The method according to claim 6, wherein the overall delay value accepted for the connection is determined according to a subscription of an originating subscriber and a subscription of a terminating subscriber.

10. The method according to claim 1, wherein a subscribed quality level indicating a target quality level for a subscriber is associated with a subscription, and wherein the one of the nodes controlling the connection checks the subscribed quality level when it performs a decision on the packetisation time to be applied for the connection.

11. The method according to claim 1, wherein the connection comprises or utilizes one or more entities impairing connection quality, and an impairment indicator indicating an expected accumulated impairment is received in the one of the nodes controlling the connection and the one of the nodes controlling the connection checks the impairment indicator when it performs a decision on the packetisation to be applied for the connection.

12. The method according to claim 1, wherein the connection comprises or utilizes one or more connection stages on that the transmission bandwidth should be minimized, wherein a high compression route indicator indicating the demand to minimized the transmission bandwidth is received in the one of the nodes controlling the connection and the one of the nodes controlling the connection checks the high compression route indicator when it performs a decision on the packetisation to be applied for the connection.

13. The method according to claim 1, wherein the establishment or modification of the connection comprises a negotiation of one or more coding schemes to be applied for the connection and wherein the indicator indicating the expected accumulated delay is sent during the negotiation of the one or more coding schemes.

14. The method according to claim 13, wherein a list of one or more coding schemes applicable for the connection is sent between the nodes controlling the connection.

15. The method according to claim 14, wherein corresponding one or more indications indicating an expected accumulated delay are associated with the one or more coding schemes and sent between the nodes controlling the connection.

16. The method according to claim 15, wherein an intermediate node controlling the connection checks the one or more indications of the expected accumulated delay corresponding to the one or more coding schemes and adjusts them before forwarding them to a further node controlling the connection.

17. The method according to claim 14, wherein one or more selectable packetisation times are associated with the one or more selectable coding schemes and sent between the nodes controlling the connection.

18. The method according to claim 17, wherein an intermediate node of the nodes controlling the connection adjusts at least one of the selectable packetisation times and forwards them to a further node controlling the connection.

19. The method according to claim 18, wherein the one of the nodes controlling the connection checks a coding scheme to be applied for the connection in a decision on the packetisation time to be applied for the connection.

20. A network node for controlling an establishment or a modification of a connection according to a packet based transmission scheme in a plurality of different communication networks comprising a plurality of nodes, wherein the connection to be established or modified comprises or utilizes one or more entities introducing a delay to a transmission over the connection, the network node comprising a reception unit for receiving an indicator indicating an expected accumulated delay or transmission of packets for the connection; a memory having delay values associated with the different communication networks in an association table having a network type and an associated delay value as corresponding entries where the delay values differentiate a transmission from and towards an originating node for the connection; and a decision unit for checking the indicator and selecting from the memory a packetisation time it takes for sending packets based on accumulated delay and allowed perceivable transmission delay to be applied for the connection.

21. The network node according to claim 20, arranged wherein the one of the nodes controlling the connection selects a packetisation time to be applied for the connection and sends a control message towards a bearer node, performing a packetisation, for the connection to control the bearer node to apply the selected packetisation time.

22. The network node according to claim 20, arranged wherein an intermediate node controlling the connection checks the indicator and adjusts it before forwarding it to a further node controlling the connection.

23. The network node according to claim 20, arranged wherein the one of the nodes controlling the connection checks an indication indicating a delay value accepted for the connection when it performs the decision on the packetisation time to be applied for the connection.

24. The network node according to claim 23, arranged wherein the overall delay value accepted for the connection is predefined for the communication network.

25. The network node according to claim 23, wherein the connection to be established or modified is a connection for a subscriber having a subscription for the communication network and the over delay value accepted for the connection is associated with said subscription.

26. The network node according to claim 25, wherein the overall delay value accepted for the connection is associated with a subscription of the originating subscriber, a subscription of a terminating subscriber or the subscription of both the originating subscriber and the terminating subscriber.

27. A network node for controlling an establishment or a modification of a connection according to a packet based transmission scheme in a communication network comprising a plurality of nodes, wherein the connection to be established or modified comprises or utilizes one or more entities introducing a delay to a transmission over the connection, the network node comprising a reception unit for receiving an indicator indicating an expected accumulated delay for the connection and a decision unit for checking the indicator and performing a decision on a packetisation time to be applied for the connection, the one of the nodes controlling the connection checks an indication indicating a delay value accepted for the connection when it performs the decision on the packetisation time to be applied for the connection, the connection to be established or modified is a connection for a subscriber having a subscription for the communication network and the overall delay value accepted for the connection is associated with said subscription, the overall delay value accepted for the connection is associated with a subscription of the originating subscriber, a subscription of a terminating subscriber or the subscription of both the originating subscriber and the terminating subscriber.

28. A method for controlling an establishment or a modification of a connection according to a packet based transmission scheme in a communication network comprising a plurality of nodes, wherein the connection to be established or modified comprises or utilizes one or more entities causing a transmission delay over the connection, an indicator indicating an expected accumulated delay of transmission of packets for the connection is sent between nodes controlling the connection wherein one of the nodes controlling the connection checks the indicator when it determines a packetisation time it takes for sending packets to be applied for the connection, the connection comprises or utilizes one or more connection stages on that the transmission bandwidth should be minimized, wherein a high compression route indicator indicating the demand to minimize the transmission bandwidth is received in the one of the nodes controlling the connection and the one of the nodes controlling the connection checks the high compression route indicator when it performs a decision on the packetisation to be applied for the connection.

29. A method for controlling an establishment or a modification of a connection according to a packet based transmission scheme in a communication network comprising a plurality of nodes, wherein the connection to be established or modified comprises or utilizes one or more entities causing a transmission delay over the connection, an indicator indicating an expected accumulated delay of transmission of packets for the connection is sent between nodes controlling the connection wherein one of the nodes controlling the connection checks the indicator when it determines a packetisation time it takes for sending packets to be applied for the connection, the one of the nodes controlling the connection checks an indication indicating a delay value accepted for the connection when it performs the decision on the packetisation time to be applied for the connection, the connection to be established or modified is a connection for a subscriber having a subscription for the communication network and the overall delay value accepted for the connection is associated with said subscription, the overall delay value accepted for the connection is determined according to a subscription of an originating subscriber and a subscription of a terminating subscriber.

* * * * *

UNITED STATES PATENT AND TRADEMARK OFFICE
CERTIFICATE OF CORRECTION

PATENT NO. : 8,634,326 B2  Page 1 of 1
APPLICATION NO. : 12/525200
DATED : January 21, 2014
INVENTOR(S) : Witzel et al.

It is certified that error appears in the above-identified patent and that said Letters Patent is hereby corrected as shown below:

In the Specification

In Column 13, Line 18, delete "and or" and insert -- and/or --, therefor.

In the Claims

In Column 16, Line 48, in Claim 4, delete "When" and insert -- when --, therefor.

In Column 17, Line 23, in Claim 12, delete "minimized" and insert -- minimize --, therefor.

In Column 18, Line 32, in Claim 25, delete "over delay" and insert -- overall delay --, therefor.

Signed and Sealed this
Fifteenth Day of July, 2014

Michelle K. Lee
*Deputy Director of the United States Patent and Trademark Office*